PHOTOCHROMIC PHOTORESIST IMAGING

Filed Oct. 1, 1965

INVENTORS
ALAN B. AMIDON
CARL BRYNKO
BY Ronald Zibelli
James J. Ralabate
ATTORNEYS United States Patent Office 3,471,290
Patented Oct. 7, 1969

3,471,290

PHOTOCHROMIC PHOTORESIST IMAGING

Alan B. Amidon, Penfield, and Carl Brynko, West Webster, N.Y., assignors to Xerox Corporation, Rochester, N.Y., a corporation of New York Filed Oct. 1, 1965, Ser. No. 492,043
Int. Cl. G03c 5/00, 1/72
U.S. Cl. 96—36 7 Claims

ABSTRACT OF THE DISCLOSURE

An image is formed by exposing an imaging member comprising an organic photochromic material in a film forming binder to actinic electromagnetic radiation in image configuration to convert at least a portion of the material from one photochromic state to another and thereafter washing away the more soluble portions of the imaging member with a solvent for the film forming binder and the solubilized photochromic.

This invention relates in general to a novel imaging system and, more specifically, to a photoresist imaging system employing light induced changes in the solubility of organic photochromic compounds.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecule upon exposure to light. This conversion may, for example, result in the isomerization of the molecule. The conversion of each molecule normally takes place at an extremely rapid speed but actual observation of a change in color in conventional systems takes longer because of the relatively low concentration produce per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher forms of a great many different photochromic compounds so as to make them suitable for use in practical systems and, although some success has been achieved in slowing down the reconversion of the higher to the lower form of some photochromic compounds with various modifications of their substituents, no one has yet succeeded in permanently stabilizing those higher forms. Additional effort has been devoted to the problem of achieving maximum color change from the lower to the higher form of various photochromic compounds, but even had these goals been achieved the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenon of photochromism has remained largely a laboratory curiosity rather than an effective and commercially acceptable means of imaging.

It is accordingly an object of this invention to provide novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging method and apparatus utilizing photochromic compounds in which the image generated by image-wise exposure of the compound serves only as a temporary latent image for the developing and fixing steps which produce the permanent image that in no way depends upon the permanency of the higher form of the photochromic compound itself.

An additional object of the invention is to provide a raised image for selective etching processes, printing etc.

The above and still further objects of the present invention are accomplished, generally speaking, by providing a system in which a layer including a photochromic compound is exposed to an image with actinic electromagnetic radiation. This exposure source may constitute a source of visible light, ultraviolet light, X-ray or any other radiation source which is capable of converting the particular photochromic compound from one form to the other. After image-wise conversion of at least a portion of the photochromic layer from one state to the other, the photochromic layer is exposed to a solvent or a solvent vapor and because of the marked difference in solubility and wettability between the two states of the same photochromic compound, either the exposed or unexposed portions are dissolved away. It should be emphasized here that the exposure must only convert enough photochromic molecules to produce a significant difference between the adhesive properties of the exposed and unexposed areas. Because of the relatively small number of molecules which must be converted to fulfill this requirement with some materials, a visible color change need not necessarily be produced in all instances.

The photochromic layer may be composed solely of one or more photochromic compounds providing that it has sufficient strength. For convenience, however, the photochromic material will generally be dissolved in solid solution or dispersed in a natural or synthetic resin. This resin may be thought of as a binder or matrix for the photochromic material. The use of such a resin as a binder or matrix for the photochromic compound permits the choice of the photochromic compound to be made from an even larger group of materials including even those which have relatively low strength and poor film formability. Since many photochromic compounds are relatively expensive the use of the resin also serves to decrease the overall cost of the imaging layer. Dyes, pigments or other coloring agents may also be added to the photochromic layer and it may be deposited on a substrate of contrasting color to make the final image more easily visible or the final pattern of uncolored photochromic material may be used simply as an etching resist.

In order that the invention will be more clearly understood, reference is now made to the accompanying drawings in which an embodiment of the invention is illustrated by way of example and in which.

Figure 1:
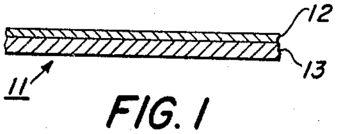
FIGURE 1 is a side sectional view of an imaging member made according to the invention.

Referring now to FIGURE 1, there is seen an imaging member generally designated 11 made up of a photoresponsive layer 12 on a supporting substrate 13. Any convenient material, such as copper, brass, aluminum, polyethylene terephthalate, polycarbonates, polyurethanes, glass or the like, may be employed to fabricate layer 13 so that the substrate will provide mechanical strength to the imaging member especially when it is softened for development. Imaging layer 12, may as stated above, consist entirely of a photochromic compound providing that it is strong enough to have structural integrity when coated. In addition to the aforementioned substrates various other substrates may be employed and may even be preferred for specialized uses. Thus, for example, where the image is to be employed for printing, a specialized water wettable substrate may be employed while if the process is employed to form a pattern of an etch resistant material on a printed circuit, the printed circuit board may be employed as the substrate. In the event that the image is to be viewed directly it may also be desirable to form the substrate of a material which has a color that contrasts strongly with the imaging layer to facilitate viewing.

Since most photochromic compounds are relatively expensive as compared with resins which are suitable for use in combination therewith and since some photochromics have low physical strength, the photochromic will generally be dissolved in or dispersed in a resin. Any suitable resin may be used. Typical resins include Staybelite Ester 10 ( a glycerol ester of partially (50%) hydrogenated rosin sold by the Hercules Powder Company of Wilmington, Del.; Velsicol EL–11, a terpolymer of styrene, indene and isoprene, marketed by the Velsicol Chemical Company of Chicago, Ill.; polyalpha-methyl styrene; Piccolyte S–70 and S–100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 100, respectively); Piccodione 2212 (a styrene-butadiene resin available from the same company); Piccolastic A–75, D–100 and E–100 (polystyrene resins with melting points of 75° C., 100° C., and 100° C., respectively, available from the same company); Neville R–21, R.9 and Nevillac Hard (cumarone-indene resins) Amberol ST137X (an unreactive, unmodified phenolformaldehyde resin available from Rohm & Haas); ethyl cellulose; ethyl hydroxy cellulose; nitrocellulose; ethyl acrylate polymer, methyl acrylate polymer, methyl methacrylate polymer, Aroclor 1242 (a chlorinated polyphenyl); Pliolite AC (a styrene-acrylate copolymer) Pliolite VTAC (a vinyl toluene-acrylate copolymer); and Neolyn 23 (an alkyd resin available from Hercules Powder Co.) chlorinated rubber, paraffin wax; polycarbonates; polyurethanes; epoxies; polyvinyl chloride; polyvinylidene chloride; polyvinyl butyral; shellac; amine-formaldehydes; polyvinyl acetals; silicones; phenoxies; polyvinyl fluorides and mixtures and copolymers thereof.

As stated above, the percentage of photochromic compound in the imaging coating 12 may range anywhere from 100% by weight of photochromic compound down to about 1% by weight of photochromic with the remainder being a resin of the type described herein. Any suitable photochromic compound may be employed. Typical photochromic compounds include: Spiropyrans such as 1,3,3-trimethyl-6′-nitro-8′-allyl-spiro (2′H-1′-benzopyran-2,2′-indoline);
1,3,3-trimethyl-5,6′-dinitro-spiro (2′H-1′-benzopyran 2,2′-indoline);
1,3,3-trimethyl-7′-nitro-spiro (2′-H-1-benzopyran-2,2′-indoline);
3-methyl-6-nitro-spiro-(2H-1-benzopyran-2,2′-2′H-1′-beta-naphthopyran);
1,3,3-trimethyl-8′-nitro-spiro (2′H-1′ benzopyran-2,2′ indoline);
1,3,3-trimethyl-6′-methoxy-8′-nitro-spiro (2′H-1′-benzopyran-2,2′-indoline);
1,3,3-trimethyl-7-methoxy-7′ chloro-spiro (2′H-1′-benzopyran-2,2′-indoline);
1,3,3-trimethyl-5 chloro-5′ nitro-8′ methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′methoxy-spiro (2′H-1′-benzopyran-2,2′-indoline);
7′-nitro-spiro-(xantho-10,2′ (2′H-1′-benzobetanaptho-pyran);
3,3′-dimethyl-6′-nitro-spiro (2′H-1′-benzopyran-2,2′-benzothiazole);
3,3′-dimethyl-6′-nitro-spiro (2′H-1′-benzopyran-2,2′-benzo-oxazole);
1,3-trimethyl-nitro-spiro (2′H-1′-benzopyran-2,2′-indoline);
6′-nitro-8′-methoxy-1,3,3-trimethylindolinebenzopyrylospiran;
6′-nitro-1,3,3-trimethylindolinobenzopyrylospiron;
8′-allyl-1,3,3-trimethylinolinobenzopyrylospiran;
8′ carbomethoxy-1,3,3-trimethylindolinobenzopyrylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran, 8′-nitro-1,3,3-trimethylindolinobenzopyrylospiran;
6′,8′-dibromo-1,3,3-trimethylindolinobenzopyrylospiran;
6′-chloro-8′-nitro-1,3,3-trimethylindolinobenzopyrylospiran;
5-nitro-6′-1,3,3-trimethylindolinobenzopyrylospiran;
6′-nitro-8′-fluoro-1,3,3-trimethylinolinobenzopyrylospiran;
6′-methoxy-18′-nitro-1,3,3-trimethylindolinobenzopyrylospiran;
5′-nitro-8′-methoxy-1,3,3-trimethylindolyinobenzopyrylospiran;
6′-bromo-8′-nitro-1,3,3-trimethylindolinobenzopyrylospiran, Anthrones such as bianthrone;
xanthylideneanthrone, 4,4′-methylanthrone;
4,4′-methoxybianthrone;
3-chloro-10-(9′-xanthylidene)-anthrone;
3-methyl-10-(9′-xanthylidene)-anthrone;
4′-chloro-10-(9′-xanthylidene)-anthrone; and
10′-9′-2′-methyl xanthylidene)-anthrone;
Sydnones such as N-(3-pyridyl)-sydnone;
N-benzylsydnone;
N-p-methylbenzyl-sydnone;
N-3,4-dimethylbenzylsydnone;
N-p-chlorobenzylsydnone;
N,n′-ethylene-bissydnone; and
N,N′-tetramethylenebis sydnone;
Anils such as salicylidene aniline;
6-bromo salicylidene-alpha-naphthylamine;
salicylidene-m-phenylenediamine;
salicylidene-m-phenylenediamine;
salicylidene-m-toluidene;
salicylidene 3,4-xylidene;
salicylidene-p-anisidine, o-nitrobenzidene-p-aminobiphenyl;
o-nitrobenzidene-m-nitroaniline;

o-nitrobenzidene-p-phenetidine;
salicylidene-p-aminebenzoic acid;
p-hydroxy benzidene-p-bromoaniline;
p-hydroxy-benzidene 2,4-xylidine;
2-hydroxy-3-methoxybenzidene 2,5-xylidine; and
salicylidene-o-chloroaniline;
Hydrazones such as the
2,4-dinitrophenylhydrazone of 5-nitro-salicylaidehyde;
benzaldehyde beta-naphthyl-hydrazone;
benzaldehyde ansilhydrazone, benzaldehyde-m-chlorophenylhydrazone, benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolyhydrazone;
cinnamaldehyde 3,4-xylyhydrazone;
p-dimethylamino benzaldehyde beta-naphthylhydrazone;
2-furaldehyde beta-naphthylhydrazone;
1-phenol-1-hexen-3-one-phenylhydrazone, piperonal anisylhydrazone;
piperonal m-chlorophenylhydrazone;
piperonal beta-naphthylhydrazone;
piperonal m-tolyhydrazone;
p-tolualdehyde phenylhydrazone;
vanillin beta-naphthylhydrazone;
Osazones such as benzil beta-naphthyl-osazone;
benzil m-tolylosazone, benzil 2,4-xylylosazone;
4,4′-dimethoxy benzil beta-naphthylosazone;
4,4′-dimethoxy benzil phenylosazone;
4,4′-dimethoxy benzil-2,4-xylylosazone;
3,4,3′,4′-bis (methylenedioxy) benzil alphanaphthylosazone;
3,4,3′,4′-bis (methylenedioxy) benzil 2,4-xylylosazone;
Semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one-semicarbazone;
Stilbene derivatives such as 4,4′-diformamido-2,2′-stilbene disulfonic acid;
4,4′-diacetamido-2,2′-stilbene disulfonic acid and its sodium, potassium barium, strontium, calcium, magnesium and lead salt;
4,4′-bis (4-acetamidobenzoyleneamido)-2,2′-stilbene disulfonic acid;
4,4′-bis (p-(p-acetamido-benamido)benzamido)-2,2′-stibene disulfonic acid;
Fulgides (substituted succinic anhydrides) such as alpha-anisyl-gamma-phenyl fulgide;
alpha, gamma-dianisyl fulgide;
alpha, gamma-dicumyliso fulgide;
alpha, gamma-diphenyl fulgide;
alpha, gamma-distyryl fulgide;
alpha-piperonyl-gamma-phenyl fulgide;
tetraphenyl fulgide;
Amino-camphor compounds such as 3-(p-dimethyl aminophenylamino)-camphor and 3 (p-diethylaminophenylamino)camphor;
Thio indigo dyes;
o-nitrobenzyl derivatives such as 2-(2′,4′-dinitrobenzyl pyridine;
2,4,2′-trinitrodiphenylmethane;
2,4,2′,4′,2″,4″-hexanitro-triphenylmethane;
ethyl bis (2,4-dinitrophenyl) acetate;
2-(2′-nitro-4′-carboxybenzyl pyridine;

3,3′-dinitro-4,4′-bis (2-pyridylmethyl)-azoxybenzene; and,
4-(2′-nitro-4′-cyanobenzyl pyridine.

The spiropyrans are, however, a preferred class of materials owing to their superior and more sensitive imaging capabilities. Whether photoresponsive layer 12 consists of a pure photochromic compound or a blend of a photochromic compound with a resin as described above, it may be coated on the substrate or formed into a self-supporting layer by a convenient technique such as dip coating, extrusion, whirl coating, casting or the like using either a hot melt or a solution of the materials to be coated.

Dyes, pigments or other coloring agents may also be added to the imaging layer to make it intensely colored so as to make it easy to see on the substrate after non-image areas have been washed away with the solvent.

Figure 2:
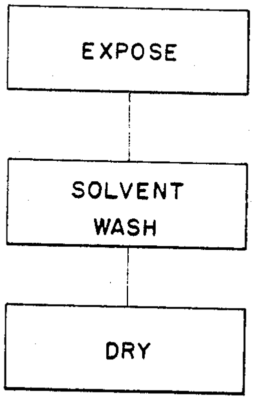
FIGURE 2 is a flow diagram of the process steps of the invention.

As shown in FIGURE 2 the basic steps involved in carrying out the process of this invention involve exposing the photoresponsive layer 12 of the imaging layer 11 to an image-wise pattern of actinic electromagnetic radiation, washing the exposed layer with a solvent to remove non-image areas and drying. In exposing to the image to be reproduced any source of electromagnetic radiation which is actinic to the photochromic material may be employed. In the case of most photochromic compounds in their lower or unexcited forms an ultraviolet radiation source may be conveniently employed to expose the material in imagewise configuration so as to convert exposed areas to the higher or excited form of the material, although light of this short wavelength is not always required. Since many photochromic materials in their higher or excited forms may be "triggered or caused to revert to the lower unexcited form by exposure to visible light, a light source in the visible range (from about 4,000–7,500 angstrom units) may be conveniently employed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited form this technique may be conveniently employed for positive to negative imaging. The intensity of the exposure need not necessarily be strong enough to produce an intense color change in the photochromic compound since with most materials this requires a conversion of a gross amount of the photochromic from one form to the other, while to be operative in the process of this invention only enough photochromic material must be converted so that a differential solubility pattern can be formed on imaging layer 12. The term "photochromic" should be understood in this context as it is used throughout the specification and claims.

Once exposure is complete the photochromic is washed with a solvent which dissolves away the more soluble portions of the layer which may consist of either the exposed or unexposed portions thereof depending upon the particular photochromic material employed. It has generally been found, however, that the higher colored form of most photochromics are less soluble than the lower forms. Where a binder is employed the solvent also washes away this binder along with the more soluble form of the photochromic compound. As stated above at least 25%–30% by weight of photochromic compound is used with most photochromic binder combinations so that sufficient colored molecules (or uncolored molecules if these are more insoluble) are generated at the surface of the image area as well as within the bulk of the binder to prevent the solvent from attacking the resin binder in image areas. The key to solvent selection then is that the solvent will dissolve and wash away the whole imaging layer in its more soluble areas regardless of whether these areas are made up of the exposed or unexposed portions thereof. Thus, where a binder is used the first consideration in solvent selection is that the solvent be capable of dissolving the binder. In essence though, any suitable solvent which will dissolve the more soluble form of the photochromic compound employed in the particular concentration at which it is used in the selected binder may be employed. Typical solvents include n-hexane; 2-methyl pentane; 3-methyl pentane; 2,2-dimethyl butane; 2,3-dimethyl butane; n-heptane; n-octane; n-nonane; n-decane; n-undecane; n-dodecane; n-tridecane; n-tetradecane; n-pentadecane; n-hexadecane; kerosene; gasoline, mineral oil, cycloparaffins such as cyclopentane, cyclohexane, cycloheptane, cyclooctane; halogenated solvents such as carbon tetrachloride, tetrafluorotetrachloropropane, chlorofrom, methylene chloride, trichloroethylene, perchloroethylene, chlorobenzene, trichloromonofluoromethane, tetrachlorodifluoroethane, trichlorotrifluoroethane; amides such as formamide; esters such as ethylacetate, isopropyl acetate, butyl acetate, amyl acetate, cyclohexyl acetate, isobutyl propionate, butyl lactate, ethers such as diethyl ether, diisopropyl ether, dioxane, tetrahydroduran, ethylene glycol monoethyl ether; ketones such as acetone, methylethyl ketone, methylisobutyl ketone and cyclohexanone, alcohols such as methanol, ethanol, isopropyl alcohol, cyclohexanol, and benzyl alcohol; aromatics such as toluene, benzene, xylene, mesitylene, pyridine and mixtures thereof.

Figure 3:
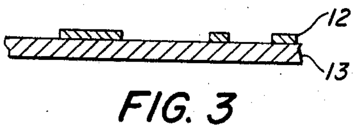
FIGURE 3 is a side sectional view of a completed image.

In FIGURE 3 there is illustrated the imaging member after completion of the solvent wash with the less soluble portions of the imaging layer 12 remaining on substrate 13.

The following illustrative examples of preferred embodiments of the invention are now given to enable those skilled in the art to more clearly understand and practice the invention described above. Unless otherwise indicated, all parts and percentages are taken by weight.

Example I

Two grams of 6′-nitro-1,3,3-trimethylindolinobenzopyrylospiran and 4 grams of Amberol ST-137X resin (described above) are dissolved in 94 grams of toluene. This solution is dip coated in the dark to a thickness of about 2 microns on an aluminum plate and air dried. The dried film is then exposed to an image transparency with a 9-watt fluoroescent light available from the Eastern Corporation of Westbury, N.Y. under the trade name "Blacklite" using a filter which passes about a 10 angstrom bandwidth centered on 3660 angstroms. After imagewise exposure a maroon colored image is seen to form on the film which is developed by washing in n-hexane. This dissolves the background clear of spiropyran and resin leaving only the image area intact.

Example II

The procedure of Example I is repeated except that one gram of carbon black is suspended in the coating solution so that a black image is produced by the resist remaining after exposure and solvent washing.

Examples III and IV

The procedure of Example I is repeated with the exception that in Example II 4 grams of the resin and 4 grams of the 6′ - nitro - 1,3,3-trimethylindolinobenzopyrylospiran are used in the coating solution while in Example IV the ratio is 1 gram of resin to 2 grams of the same photochromic spiran compound. Each of these produce about equal results with those produced by Example I, except for slightly improved sharpness in the developed image as the spiran concentration is increased.

Examples V–XVI

The procedure of Example I is followed exactly with the exception that the following resins are substituted for the Staybelite Ester resin of Example I in Examples V–XVI, respectively, Piccolyte S–70, Piccolyte S–100, Piccopale 70SF, Piccopale 85, Piccodiene 2212, alpha-methylstyrene polymer, Staybelite Ester 10, Piccolastic D–100, Piccolastic E–100, Neville R–9, Neville R–21, and Nevillac Hard. All produce about the same results as Example I.

Examples XVII–XXII

In Examples XVII and XVIII the procedure of Example I is repeated except that the photochromic compound employed is 3-N-pyridyl syndone in Example XVII and phenyl syndone in Example XVIII.

In Examples XIX–XXII the following photochromic compounds are employed. In Example XIX bianthrone is employed; in Example XX 9-xanthylidene anthrone is employed; in Example XXI the 2,4-dinitrophenylhydrazone of 5-nitro-salicylaldehyde is employed; and in Example XXII 3-N-pyridyl salicylidene is employed. In these four examples the procedure of Example I is followed except that the same filter is employed with a 100 watt light source for a 20 minute exposure. In all instances the images formed are about equal in quality with the one produced by the procedure of Example I.

Example XXIII

The procedure of Example I is repeated exactly except that the coated film is first uniformly exposed to the 3660 angstrom light source until it achieves a deep maroon color. Following this exposure a transparency to be reproduced is overlaid on the imaging layer and exposed to a source of yellow light for one hour which serves to bleach or reconvert the excited colored form of the photochromic compound back to its unexcited, colorless form in exposed areas. The solvent wash step of Example I is then carried out resulting in a photographic reversal of the original transparency.

Examples XXIV–XXX

The procedure of Example I is followed with the exception that the following photochromic compounds are used respectively, in Examples XXIV–XXX in place of the spiropyran photochromic compound of Example I: 2,4 - dinitro - phenylhydrazone; benzil beta-naphthylosazone; 2-nitrochalcone semicarbazone; alpha, gamma-diphenyl fulgide; 4,4′-diformamido-2,2′-stilbene disulfonic acid; 3-(p-dimethylaminophenylamino)-camphor; and 2-(2′,4′-dinitrobenzyl pyridine). These produce essentially the same results as Example I when a 20 minute exposure is employed.

Examples XXXI–XXXVI

The procedure of Example I is repeated except that the following resins are substituted for the amberol resin in Examples XXXI–XXXVI, respectively; an 87/13 vinyl acetate-vinyl chloride copolymer; a 90/10 styrene-butadiene; polyethylmethacrylate; polyisobutyl methacrylate; polystyrene and polyethylmethacrylate and a xylene solvent wash is used. All produce about the same results as Example I.

Examples XXXVII–XLI

The procedure of Example I is repeated exactly except that the solvent used for development in Examples XXXVII–XLI, respectively, are: ethylene dichloride; acetone; ether and toluol. No difference is seen in the results thus produced.

Although specific materials and conditions are set forth in the above examples, these are merely illustrative of the present invention. Various other materials, such as any of the typical photochromic and/or resins listed above which are suitable, may be substituted for the materials listed in the examples with similar results. The films of this invention may also have other materials mixed, dispersed, copolymerized or otherwise added thereto to enhance, sensitize, synergize or otherwise modify the properties thereof. Many modifications and/ or additions to the process will readily occur to those skilled in the art upon reading this disclosure, and these are intended to be encompassed within the spirit of the invention.

What is claimed is:

1. A photographic method comprising the steps of providing an imaging layer comprising a solid solution of an organic photochromic material which exhibits a marked change in solubility and wettability in a solvent with changes in its photochromic state upon exposure to actinic electromagnetic radiation and a film forming resin soluble in said solvent wherein said imaging layer contains from about 6 parts to about 28 parts by weight of said film forming binder to about 12 parts by weight of said photochromic material, exposing said imaging layer to an actinic electromagnetic radiation pattern of sufficient energy to convert at least a portion of said organic photochromic material from one photochromic state to another thereby forming a differential solubility pattern in said imaging layer and washing away in conformance to said pattern substantially all of the more soluble portions of said imaging layer with said solvent, said imaging layer containing sufficient organic photochromic material to prevent said solvent from washing away all of the less soluble portions of said imaging layer.

2. A photographic method according to claim 1 in which said photochromic material is initially in its lower, unexcited state including exposing said imaging layer with an electromagnetic radiation pattern of sufficient energy to convert exposed areas thereof to a higher excited photochromic state.

3. A photographic method according to claim 1 in which said photochromic material is initially in its higher, excited state including exposing said imaging layer with an electromagnetic radiation pattern of sufficient energy to convert exposed areas thereof to a lower unexcited photochromic state.

4. A photographic method according to claim 1 including exposing said imaging layer to a visible light pattern capable of causing said photochromic material to return to the lower unexcited state in exposed areas.

5. A photographic method according to claim 1 in which said photochromic material comprises a photochromic 1,3,3-trimethylindolinobenzopyrylospiran.

6. A photographic method according to claim 5 in which said photochromic material comprises a 6'-nitro-1,3,3-trimethylindolinobenzopyrylospiran.

7. A photographic method according to claim 1 in which said imaging layer is supported by a water wettable substrate.

References Cited

UNITED STATES PATENTS

| | | | |
|---|---|---|---|
| 3,291,624 | 12/1966 | Michel et al. | 96—29 |
| 3,359,103 | 12/1967 | Becker et al. | |
| 3,416,922 | 12/1968 | Sus et al. | 96—88 |
| 3,341,330 | 9/1967 | Foris. | |
| 3,346,385 | 10/1967 | Foris | 96—36.2 |

NORMAN G. TORCHIN, Primary Examiner

MARY F. KELLY, Assistant Examiner

U.S. Cl. X.R.

96—89, 90